US009304894B2

(12) United States Patent
Fishaimer

(10) Patent No.: US 9,304,894 B2
(45) Date of Patent: Apr. 5, 2016

(54) CODE-FREE TESTING FRAMEWORK

(71) Applicant: CA, Inc., Islandia, NY (US)

(72) Inventor: Tomer Fishaimer, Nahal Sorek (IL)

(73) Assignee: CA, Inc., Islandia, NY (US)

( * ) Notice: Subject to any disclaimer, the term of this patent is extended or adjusted under 35 U.S.C. 154(b) by 294 days.

(21) Appl. No.: 13/692,348

(22) Filed: Dec. 3, 2012

(65) Prior Publication Data

US 2014/0157241 A1 Jun. 5, 2014

(51) Int. Cl.
*G06F 9/44* (2006.01)
*G06F 9/46* (2006.01)
*G06F 17/30* (2006.01)
*G06F 19/00* (2011.01)
*G06F 11/36* (2006.01)
*G06F 9/50* (2006.01)
*G06F 11/22* (2006.01)

(52) U.S. Cl.
CPC .............. *G06F 11/3692* (2013.01); *G06F 8/70* (2013.01); *G06F 9/5044* (2013.01); *G06F 11/3688* (2013.01); *G06F 11/2294* (2013.01)

(58) Field of Classification Search
CPC ............ G06F 11/3664; G06F 11/3688; G06F 11/3684; G06F 11/3672; G06F 11/3692; G06F 8/61; G06F 8/30; G06F 9/5044; G06F 9/547; G06F 11/2294; G06F 11/3676; G06F 11/3414; G06F 11/368; G06F 8/70; G06F 8/38; H04L 63/0281
See application file for complete search history.

(56) References Cited

U.S. PATENT DOCUMENTS

| | | | |
|---|---|---|---|
| 6,360,268 B1 | 3/2002 | Silva et al. | |
| 6,779,134 B1 | 8/2004 | Laviolette et al. | |
| 7,334,162 B1* | 2/2008 | Vakrat | G06F 11/2294 717/124 |
| 8,386,419 B2* | 2/2013 | Yalamanchilli | 717/126 |
| 8,578,336 B1 | 11/2013 | Wiradarma et al. | |
| 8,745,200 B2 | 6/2014 | Mali | |
| 2002/0062475 A1* | 5/2002 | Iborra | G06F 8/30 717/108 |
| 2003/0055936 A1 | 3/2003 | Zhang et al. | |
| 2003/0084429 A1* | 5/2003 | Schaefer | G06F 11/3664 717/125 |
| 2003/0120829 A1 | 6/2003 | Avvari et al. | |
| 2003/0131088 A1 | 7/2003 | Morrissey et al. | |
| 2003/0140138 A1 | 7/2003 | Dygon et al. | |
| 2004/0015975 A1* | 1/2004 | Nandigama | G06F 9/5044 718/104 |
| 2005/0138426 A1* | 6/2005 | Styslinger | H04L 63/0281 726/4 |
| 2007/0033441 A1 | 2/2007 | Sathe et al. | |

(Continued)

OTHER PUBLICATIONS

George Fink et al., Property-Based Testing: A New Approach to Testing for Assurance, Jul. 1997, vol. 22, [Retrieved on Nov. 16, 2015]. Retrieved from the internet: <URL: http://dl.acm.org/citation.cfm?id=263267> 7 Pages (74-80).*

(Continued)

*Primary Examiner* — Thuy Dao
*Assistant Examiner* — Anibal Rivera
(74) *Attorney, Agent, or Firm* — Stevens & Showalter, LLP

(57) ABSTRACT

A method, system and computer program product for testing software comprises discovering, by an agent executing on a computer, testable code configured to execute on the computer; receiving, by the agent, a request related to testing the testable code from a requestor; in response to the request, sending the requestor a property of the testable code; receiving, by the agent, data related to the property; activating; by the agent, the testable code wherein the received data is associated with the property in order to produce a result from the activated testable code; and returning, by the agent, the result to the requestor.

30 Claims, 7 Drawing Sheets

(56) References Cited

U.S. PATENT DOCUMENTS

| | | | | |
|---|---|---|---|---|
| 2008/0163165 | A1* | 7/2008 | Shitrit | G06F 11/3688 717/107 |
| 2009/0007078 | A1* | 1/2009 | Hoyek | G06F 11/3688 717/131 |
| 2009/0138855 | A1* | 5/2009 | Huene | G06F 11/3676 717/125 |
| 2010/0180260 | A1* | 7/2010 | Chikkadevaiah | G06F 11/3688 717/125 |
| 2011/0131001 | A1* | 6/2011 | Mathur | G06F 11/3664 702/122 |
| 2011/0145795 | A1* | 6/2011 | Khanapurkar | G06F 11/3414 717/126 |
| 2012/0042210 | A1 | 2/2012 | Glaser et al. | |
| 2012/0144373 | A1* | 6/2012 | Cook | G06F 8/38 717/125 |
| 2012/0151448 | A1 | 6/2012 | Becker et al. | |
| 2012/0174068 | A1* | 7/2012 | Gutfleisch et al. | 717/124 |
| 2013/0042222 | A1* | 2/2013 | Maddela | G06F 8/70 717/124 |
| 2013/0055028 | A1 | 2/2013 | Patil et al. | |
| 2013/0080999 | A1 | 3/2013 | Yang | |
| 2013/0152047 | A1 | 6/2013 | Moorthi et al. | |
| 2014/0157057 | A1 | 6/2014 | Fishaimer | |

OTHER PUBLICATIONS

Mary Shaw et al., Abstractions for Software Architecture and Tools to Support Them, Apr. 1995, IEEE vol. 21 No. 4, [Retrieved on Nov. 16, 2015]. Retrieved from the internet: <URL:http://ieeexplore.ieee.org/stamp/stamp.jsp?tp=&arnumber=385970> 27 Pages (314-335).*

Duncan, Marc M.; Non-Final Office Action; U.S. Appl. No. 13/692,228, filed Jul. 10, 2014; United States Patent and Trademark Office; Alexandria, VA.

Duncan, Marc M.; Final Office Action; U.S. Appl. No. 13/692,228, filed Oct. 24, 2014; United States Patent and Trademark Office; Alexandria, VA.

* cited by examiner

CODE-FREE TESTING FRAMEWORK

CROSS REFERENCE TO RELATED APPLICATION

This application is related to an application filed concurrently herewith entitled "Code-Free Testing Framework," by Tomer Fishaimer, U.S. patent application Ser. No. 13/692,228, filed Dec. 3, 2012, the entire disclosure of which is incorporated herein by reference.

BACKGROUND

The present disclosure relates to deployed applications, and more specifically, to testing a deployed application.

One aspect of developing complex, and not-so-complex, software applications relates to testing of the software application. Typical software testing may involve providing a software tester with a complete version of a software application, in various stage of development, and then having them randomly use the application in an attempt to identify problems. There have been attempts, however to automate software testing. These attempts, however require knowing the structure of the software application and having sufficient programming ability to create an automatic testing framework that autonomously inputs different, pre-selected data sets into the application and analyzes the resulting output. Thus, developing and designing such an automated testing framework requires a software tester that is highly knowledgeable about the details of the software application and highly skilled in programming as well. While such an approach is, at best, difficult to implement even if started at the early stages of developing an application, it is nearly impossible to implement for legacy code that has already been deployed into operation.

BRIEF SUMMARY

According to one aspect of the present disclosure, a computer-implemented method for testing software, comprises discovering, by an agent executing on a computer, testable code configured to execute on the computer; receiving, by the agent, a request related to testing the testable code from a requestor; in response to the request, sending the requestor a property of the testable code; receiving, by the agent, data related to the property; activating; by the agent, the testable code wherein the received data is associated with the property in order to produce a result from the activated testable code; and returning, by the agent, the result to the requestor.

According to another aspect of the present disclosure, a system for testing software, comprises an agent module executing on a computer, configured to discover testable code configured to execute on the computer; the agent module further configured to receive a request related to testing the testable code from a requestor; the agent module further configured to, in response to the request, send the requestor a property of the testable code; the agent module further configured to receive data related to the property; the agent module further configured to activate the testable code wherein the received data is associated with the property in order to produce a result from the activated testable code; and the agent module further configured to return the result to the requestor.

According to another aspect of the present disclosure, a system for testing software, comprises an agent module executing on a computer, configured to discover testable code configured to execute on the computer; the agent module further configured to receive a request related to testing the testable code from a requestor; the agent module further configured to, in response to the request, send the requestor a property of the testable code; the agent module further configured to receive data related to the property; the agent module further configured to activate the testable code wherein the received data is associated with the property in order to produce a result from the activated testable code; and the agent module further configured to return the result to the requestor.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
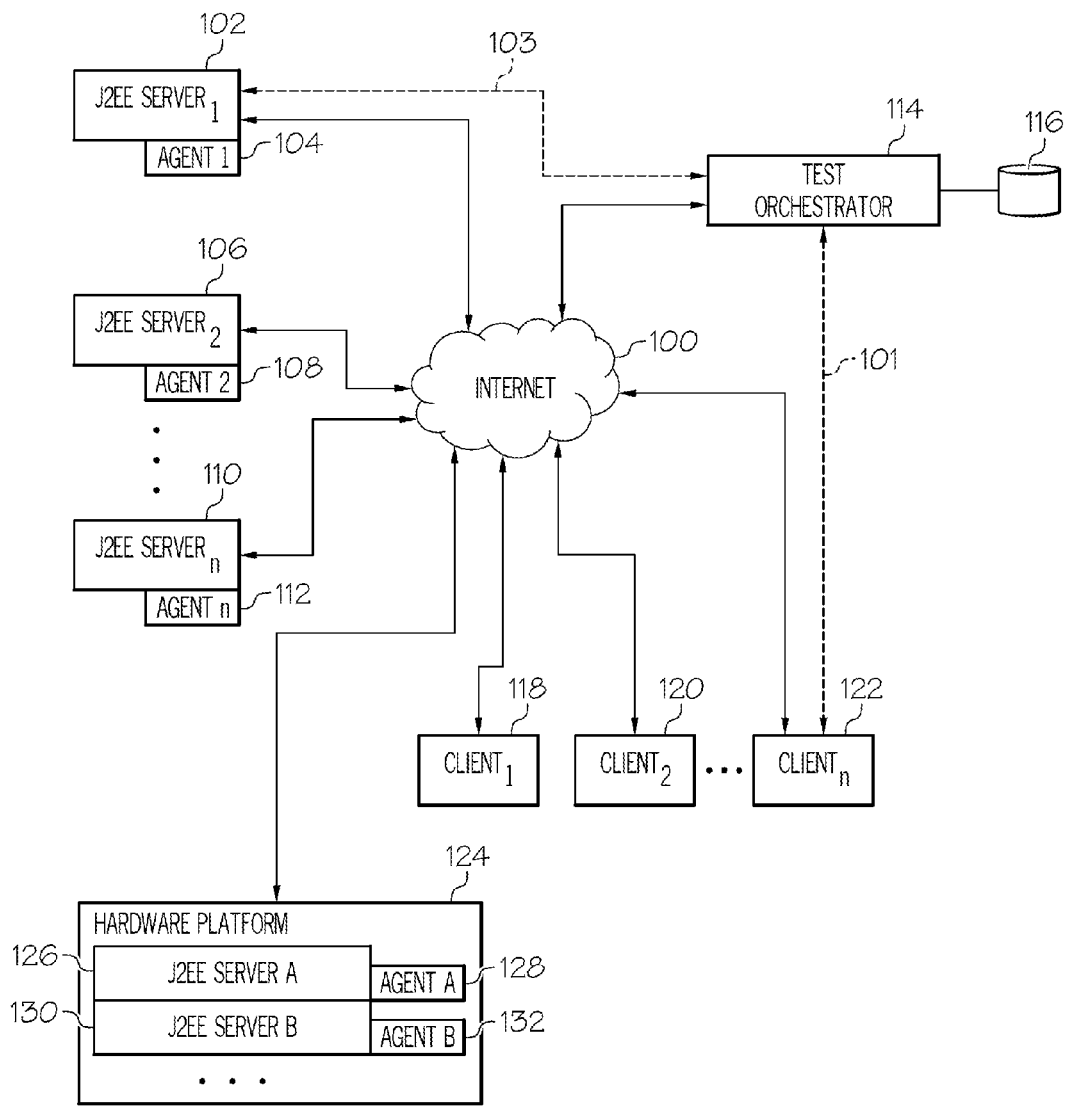
FIG. 1 illustrates an example computing environment in which a code-free testing framework can be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

To aid in understanding aspects of the present disclosure, an example environment of J2EE managed servers is described, with respect to FIG. 1. However, one of ordinary skill will readily recognize that this environment is provided merely by way of example and the functionality and behavior described herein is not limited to this environment but can, for example, be implemented with .NET managed servers and the like. The example environment of FIG. 1 is merely one particular example of an environment that provides a code-free testing framework.

Referring to FIG. 1, different J2EE servers may be located at different physical or logical locations accessible using a network 100 and each of the J2EE servers provide one or more executing applications which can be utilized by a client. For example, one J2EE server 102, a second J2EE server 106, and other J2EE servers 110 can be deployed on various hardware platforms in communication with the network 100 (e.g., the Internet). Each J2EE server is not necessarily isolated at a unique hardware location, although that can occur. For example, a hardware platform 124 can have more than one concurrently executing J2EE server (e.g., server 126 and server 130). Examples of conventional J2EE servers include JBOSS, WebLogic, and WebSphere. One of ordinary skill will recognize that a J2EE server is one type of application server wherein an application server, in general, provides an environment in which various applications can execute. For example, application servers usually provide services such as security, data services, transaction support, and load balancing so that applications running on the server do not need to explicitly include such services.

In the environment of FIG. 1, there is a respective test agent associated with each of the J2EE servers. Specifically, test agent Agent1 104 is associated with the J2EE server 102; test agent Agent2 108 is associated with the J2EE server 106; test agent AgentN 112 is associated with the J2EE server 110; test agent AgentA 128 is associated with the J2EE server 126; and test agent AgentB 132 is associated with the J2EE server 130. As explained more fully below, each respective test agent provides access to testable code associated with its associated J2EE server. For example, the J2EE Server 106 may have two different components that execute within its environment. The test agent Agent2 108 is configured to discover portions of each component that can be tested and to facilitate interaction with that code by a client.

In a particular example, the testable code can comprise a plurality of components and each component (e.g., a Java component) available within the environment of the J2EE server 106 may be an Enterprise Bean defined by a respective .class file; in another example, the components may be part of a package that has a number of related .class files. In either instance, the test agent Agent2 108 executes on the J2EE server 106 and can identify the .class files defining the components. Once the .class files are identified, then the test agent Agent2 108 can identify respective methods that become available when each .class file is instantiated as a respective object.

Each test agent (e.g., 104, 108, 112, 128, 132) may also register with a test orchestrator 114. The test orchestrator 114 may be an application accessible through the network 100 and may simplify access by clients to the different J2EE servers (e.g., 102, 106, 110, 126, 130). For example, the test agent Agent1 102 may be developed with foreknowledge of the existence, and location, of the test orchestrator 114. Thus, when the test agent Agent1 104 is deployed on the application server 102 it may register with the test orchestrator 114. When a test agent (e.g., 104, 108, 112, 128, 132) registers with the test orchestrator 114, the test agent can identify the appropriate application server (e.g., 102, 106, 110, 126, 130) on which it is deployed as well as information about the components that comprise the testable code that each agent discovers. The test orchestrator 114 can have storage 116 available to store the information related to those test agents (e.g., 104, 108, 112, 128, 132) which have registered with the test orchestrator 114.

As a result of the test agents (e.g., 104, 108, 112, 128, 132) registering with the test orchestrator, the test orchestrator 114 has knowledge of how to locate the application servers (e.g., 102, 106, 110, 126, 130). There may be one or more clients such as client1 118, client2 120, and clientN 122 that desire to test testable code that is available on one or more of the application servers (e.g., 102, 106, 110, 126, 130). Each client (e.g., 118, 120, 122) may be a web browser that can be used by a quality assurance engineer, an application developer or a software engineer to test software applications in accordance with the principles of the present disclosure. Each client (e.g., 118, 120, 122), therefore, may communicate with just the test orchestrator 114 so that each client does not need to know how to directly communicate with each of the application servers. Accordingly, the dashed lines 101 and 103 of FIG. 1 represent the apparent communication that takes place between the clients (e.g., 118, 120, 122), the test orchestrator 114, and the application servers (e.g., 102, 106, 110, 126, 130).

Figure 2A:
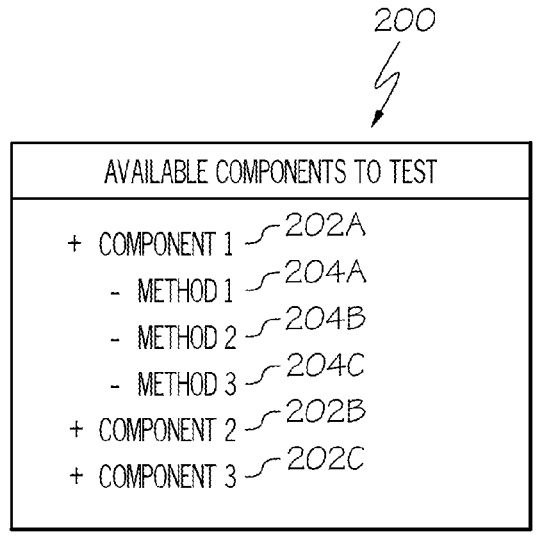
FIG. 2A-FIG. 2C illustrate an example user interface of a code-free testing framework in accordance with the principles of the present disclosure.
Figure 2B:
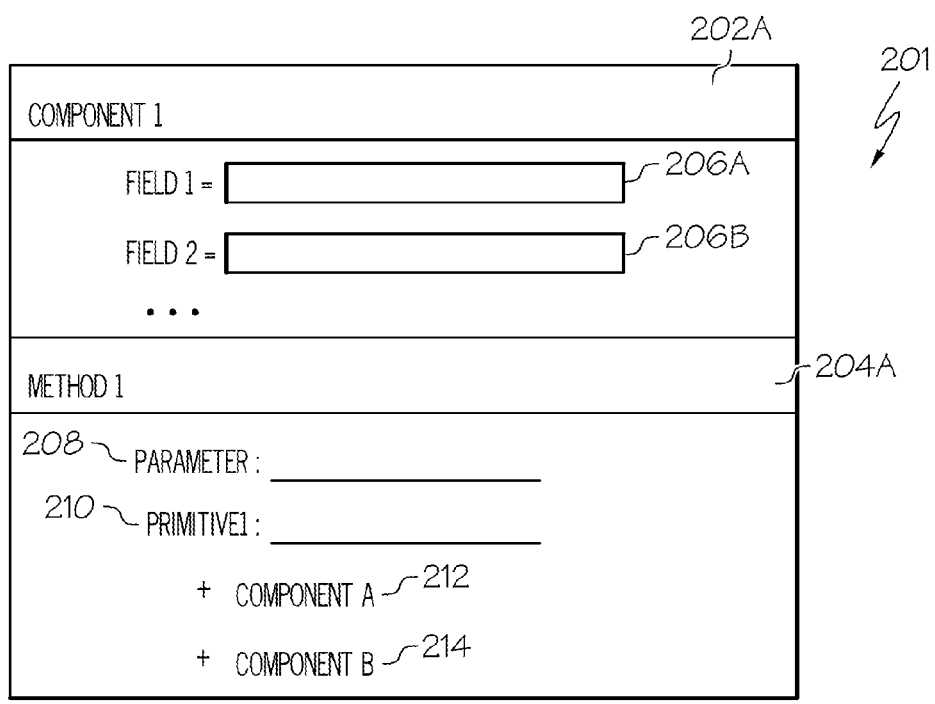
Figure 2C:
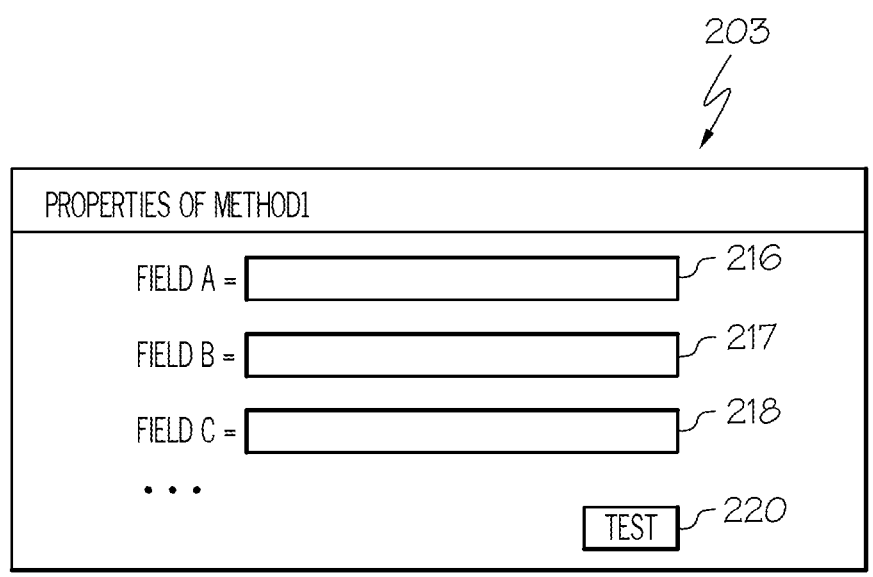

FIG. 2A-FIG. 2C illustrate an example user interface of a code-free testing framework in accordance with the principles of the present disclosure. The orchestrator 114 can provide a client (e.g., 118, 120, 122) with a list of available test agents (e.g., 104, 108, 112, 128, 132) which the client may be authorized to access. The client may then select a particular one of the agents and then the client is presented with information about testable code which is accessible using that particular test agent. For example, the client may be presented a user interface screen 200 that lists components which the client may test. A component may, for example, comprise one or more .class files, which can be instantiated to define one or more objects.

Returning to FIG. 1, client1 118 may have selected Agent1 104 such that client1 118 is presented with a list of components that are installed (i.e., deployed) to be executed on the J2EE Server1 102. Each component may have a corresponding .class file residing in an appropriate location on the J2EE Server1 102. For example, the J2EE Server1 may have an environmental variable that defines the default path locations for where all possible .class files are stored on the J2EE Server1 102. These .class files provide the definition of the different components that can be instantiated as objects and tested by the client1 118 via the test orchestrator 114 and the test agent Agent1 104.

In the example screen 200 of FIG. 2A, the client client1 118 is presented with a list having three components Component) 202A, Component2 202B, and Component3 202C. Assuming that the client1 118 clicked on Component1 202A, an expanded drop-down list can appear that lists the three methods declared within Component) 202A which are, for example, Method) 204A, Method2 204B, and Method3 204C.

When client client1 118 selects Method) 204A, for example, then the user interface screens 201 and 202 of FIG. 2B and FIG. 2C, respectively, can be provided to the client client1 118. The user interface screens 200, 201 and 202 are merely examples of what information can be provided by a test agent and how it may be arranged. The information may also vary according to a particular structure of the component or method that is being tested.

In the example screen 201, the testable component Component1 202A has two fields 206A and 206B. The fields represent variables within the component that can be assigned different values by the client client1 118 via the user interface screen 201. A field has a label (e.g., "Field1") and an assigned value. The particular values assigned to Field1 206A and Field2 206B may affect multiple methods within Component) 202A and, thus, they may be grouped and displayed as shown in FIG. 2B. The Method1 204A may have its own fields that are variables applicable only within Method1 204A. The three fields of user interface screen 203, FieldA 216, FieldB 217, and FieldC 218 can be collectively referred to as the properties of Method1 204A. Field1 206A and Field2 206B apply to all methods within Component1 202A and, hence, are also considered properties of Method1 204.

Other information about the Method1 204A can also be provided via the user interface screen 201. For example, parameters 208 that are passed to the Method1 204A can be identified; and also the primitive type (e.g., int, double, string, etc.) of the Method1 204A can be provided as well. It is possible for a method to also refer to a component, thus ComponentA 212 and ComponentB 214 may also be available for selection and testing. The various fields 206A, 206B, 216, 217, and 218 are depicted as boxes to indicate that their values may be changed. For example, the following example code provides a simple example of a .java file that could be compiled to create a .class file defining a component that can be instantiated as an object to be tested.

```
public class Rectangle {
    public Rectangle(int width, int height) {
        myDimension.width = width;
        myDimension.height = height;
    }
    public double getArea( ) {
        return myDimension.width * myDimension.height;
    }
    public double getPerimeter {
        return 2*(myDimension.width+myDimension.height);
    }
    public String getDescription{
        private String myLabel = "Rectangle"
        return myLabel;
    }
}
```

Relying on the above example, the user-interface screen 200 would list one testable component "Rectangle." Within this testable component, there would be three methods identified as "getArea", "getPerimeter" and "getDescription". The fields of "Rectangle" corresponding to 206A and 206B of FIG. 2B would be "myDimension.width" and "myDimension.height". If the method "getDescription" was selected for testing, then its list of properties in screen 203 would include one field labeled "myLabel". The text box next to that label (e.g., 216) could be initially filled in with the value "Rectangle" but this value could be changed.

Once the client1 118 is finished assigning values to all the available fields, then a "test" button 220 can be selected. In response to the "test" button 220 being selected, the test agent Agent1 104 receives the assigned values and activates the testable code of Method1 204A. In particular, the Agent1 104 invokes the Method1 using the field values provided by the client1 118 to produce a result. Using the above example code, if the client1 makes no changes, then the result of invoking "getDescription" will be the return of the string "Rectangle". If the client1 118 had used the interface screens 201 and 203 to change the value of "myLabel" to another word such as, for example, "Square", then invoking "getDescription" would have returned the string "Square".

In this manner, the client1 118 can be presented with a series of user interface screens that allows the client1 118 to test different methods of a testable component by assigning respective values to the different properties of a method and then invoking the method with those assigned respective values. No programming knowledge or skill is necessary to perform such testing and no prior knowledge about the structure of the testable components and their methods is needed.

Figure 3A:
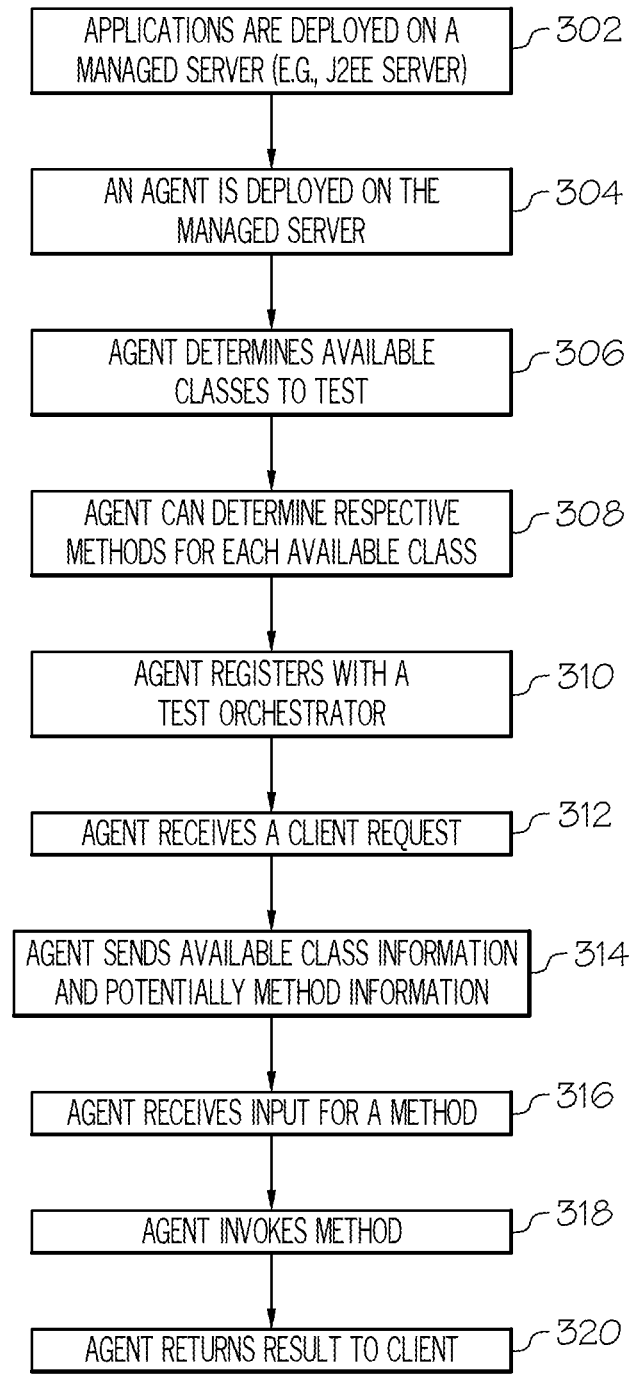
FIG. 3A depicts a flowchart of an example method for a deployed agent providing a code-free testing framework in accordance with the principles of the present disclosure.

FIG. 3A depicts a flowchart of an example method for a deployed agent providing a code-free testing framework in accordance with the principles of the present disclosure. In step 302 one or more applications are deployed on a managed server. The term "managed server" refers to a software platform in which an executable environment is provided by an application server such as, for example, a J2EE server. Within a managed server environment, executable components, or applications, have a common general format appropriate for the application server.

In step 304, a test agent is deployed on the managed server as well. By deploying the test agent on the managed server, the test agent executes within the environment of the managed server and has access to the other applications that are deployed on that server. Using this access, the test agent may determine, in step 306, all the components on the managed server that are available to be tested. One example, in a Java environment, is that the test agent may locate all the .class files in specified directory locations in the managed server environment.

The following code snippet, for example, may be one example of how a list of the class files in the current directory path could be generated by the test agent.

```
import java.io.File;
public class ListFiles {
    public static void main (String[ ] args) {
        String path = ".";
        String files;
        File folder = new File(path);
        File[ ] listOfFiles = folder.listFiles( );
        for (int i = 0; i < listOfFiles.length; i++) {
            files = listOfFiles[i].getName( );
            if (files.endsWith(".class") {
                System.out.println(files);
            }
        }
    }
}
```

Once the names of the .class files are known, the test agent can then instantiate an object corresponding to each .class file. Once instantiated, the test agent can then, in step 308, determine what methods are available for that instantiated object. Although there are a variety of different ways to inspect within an instantiated object, Java's "Reflection" API provides beneficial techniques. Similar techniques are available for C## and other programming environments as well. For example, the following code snippet illustrates how to generate a list of methods for an instantiated object:

```
import java.lang.reflect.*;
public class DumpMethods {
    public static void main(String args[ ]) {
        try {
            Class c = Class.forName(args[0]);
            Method m[ ] = c.getDeclaredMethods( );
            for (int i=0; 1 <m.length; i++)
                System.out.println(m[i].toString( ));
        }
    }
}
```

The line Class c=Class.forName(args[0]) constructs an object in the memory space of the managed server using the .class file named "args[0]". Thus, the test agent would use the appropriate name of a .class file instead of "args[0]" to instantiate any desired object. The next line Method m[ ]=c.getDeclaredMethods( ) uses the built-in method "getDeclaredMethods" to fill an array m[ ] with all the methods available in the instantiated object.

Once the test agent has identified the available components and their respective methods, the test agent can register, in step 310, with the test orchestrator. When registering, the test agent can identify the identity of the application server (e.g., a URL) and provide the discovered information about components and their methods.

In operation, the test agent, in step 312, receives a client request related to testing code. The test orchestrator, or the test agent, could send information to the client, in step 314, identifying available, testable components and their testable methods. For example, the test orchestrator could act as a proxy in all communications between a client and a test agent. Alternatively, the test orchestrator can handle an initial inquiry from a client and then share enough information to allow the client to directly communicate with the test agent.

In sending information about a testable method, the test agent identifies the properties that may be associated with the method. The Java Reflection API provides a method "getDeclaredFields" that identifies each field declared in a particular method and, for that field identifies its name, its type, and other information. The test agent can, for example, construct a fillable HTML form that can be sent to a web browser identifying the information about the fields of a method and providing corresponding text boxes that can be filled in. From the test agent's perspective, a client will input data values for the different properties (i.e., fields) associated with a method and then send those data values back as a way to request that the test agent activate, or invoke the method, using those data values.

Thus, in step 318, the test agent invokes the method using the returned data values from the client. For example, the Java Reflection class provides for a method such as Object returnObject=meth.invoke(methodName, argList) to invoke the method "methodName" using a supplied list of arguments "argList" in order to generate a result called "returnObject". This result can then be provided to the client, by the test agent in step 320, so that the client can observe that output of the method that results based on their input values they provided.

Figure 3B:
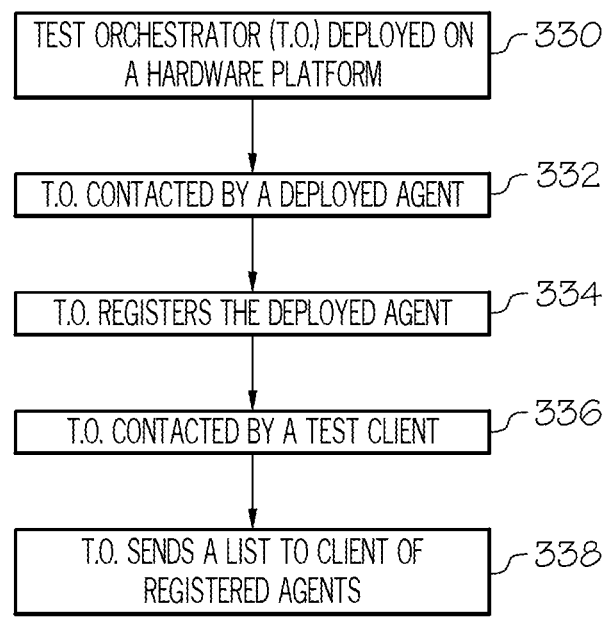
FIG. 3B depicts a flowchart of an example method for a test orchestrator to provide a code-free testing framework in accordance with the principles of the present disclosure.

FIG. 3B depicts a flowchart of an example method for a test orchestrator to provide a code-free testing framework in accordance with the principles of the present disclosure. From the perspective of the test orchestrator, it may be deployed on a hardware platform, in step 330, so that clients have a single location that they may visit to discover information about a variety of potentially available test agents and testable code. Initially, the test orchestrator is contacted, in step 332, by a deployed test agent that desires to register with the test orchestrator. Thus, in step 334, the test orchestrator registers the deployed test agent. Example information that may be involved with registering a test agent includes an identifier of the test agent, an identifier and/or location, of a managed server on which the test agent is deployed, identifiers of testable components available through the test agent, and possibly one or more methods associated with the available, testable components. For example, the identifiers of testable components may include a list of .class files, or more generally a list of available testable code, which the test agent can use to instantiate different objects to be tested.

Subsequently, the test orchestrator will be contacted by a test client wishing to use one or more of the registered test agents to test available, testable components. In step 338, the test orchestrator can send a user-interface screen that identifies the test agents registered with the test orchestrator. For example, the user interface screen may be an HTML page, viewable in a web browser, that has a respective hyperlink to each of the test agents. When a client clicks on one of the hyperlinks the client may be connected to the appropriate test agent that is executing on a corresponding managed server. The test agent may then be responsible for communicating information about testable code to the client.

As mentioned above, another alternative is that the test orchestrator can act as a proxy so that all communication, in any direction, first passes through the test orchestrator before being forwarded to either the test agent of the client.

Figure 3C:
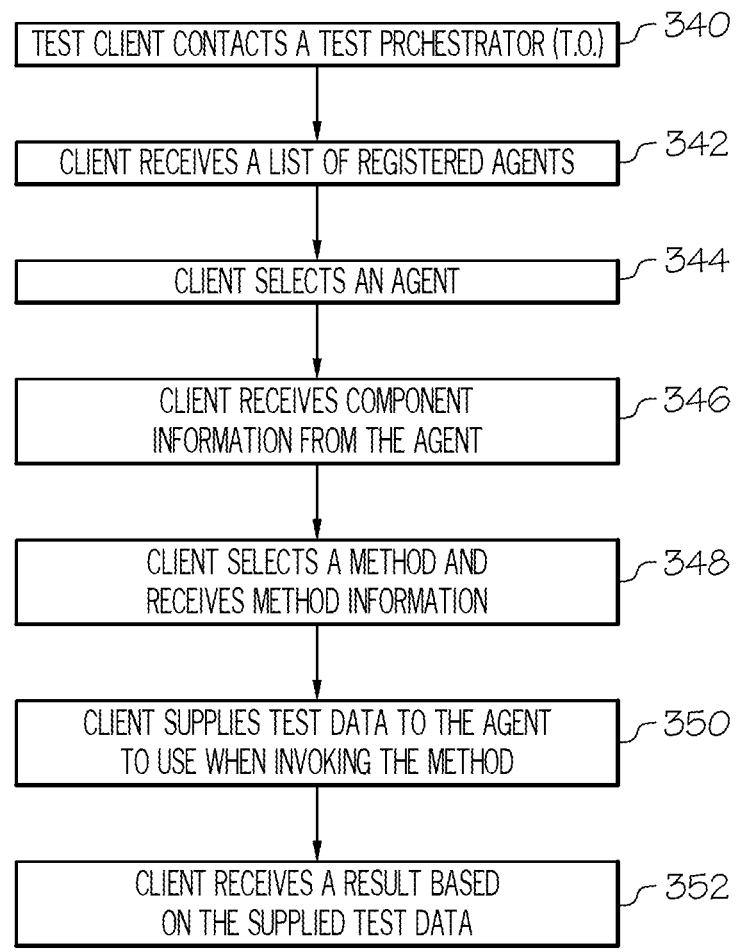
FIG. 3C depicts a flowchart of an example method for a test client to utilize a code-free testing framework in accordance with the principles of the present disclosure.

FIG. 3C depicts a flowchart of an example method for a test client to utilize a code-free testing framework in accordance with the principles of the present disclosure. From the perspective of the test client, in step 340, the client contacts the test orchestrator and, in response in step 342, the client receives a list of test agents that have previously registered with the test orchestrator. The client may then, in step 344, select one of the registered test agents.

Upon selection of a particular test agent, the client receives, in step 346, information about the components (e.g., objects defined by a class file) available for testing and their respective methods using that test agent. This information may be communicated with the client directly from a test agent or may be communicated indirectly via the test orchestrator. The client then, in step 348 selects one of the available methods of a component and, in response, receives information about that method. In particular, the information about the method relates to the properties, or fields, of that method for which the client can supply different values. In particular, the test agent provides this information in a user interface that allows the client to assign different values to each of the method's properties and then request that these assigned values be used.

Thus, in step 350, the client supplies data values, or test data to the test agent and requests that the test agent invoke the method using this test data. The test agent invokes the method using the test data which generates a result based on the particular values of the test data. In step 352, the client receives from the test agent the result generated based on the supplied test data. This process can be easily repeated to supply a variety of test data to a particular method or for selecting different methods, or even different components available through the test agent.

Figure 4:
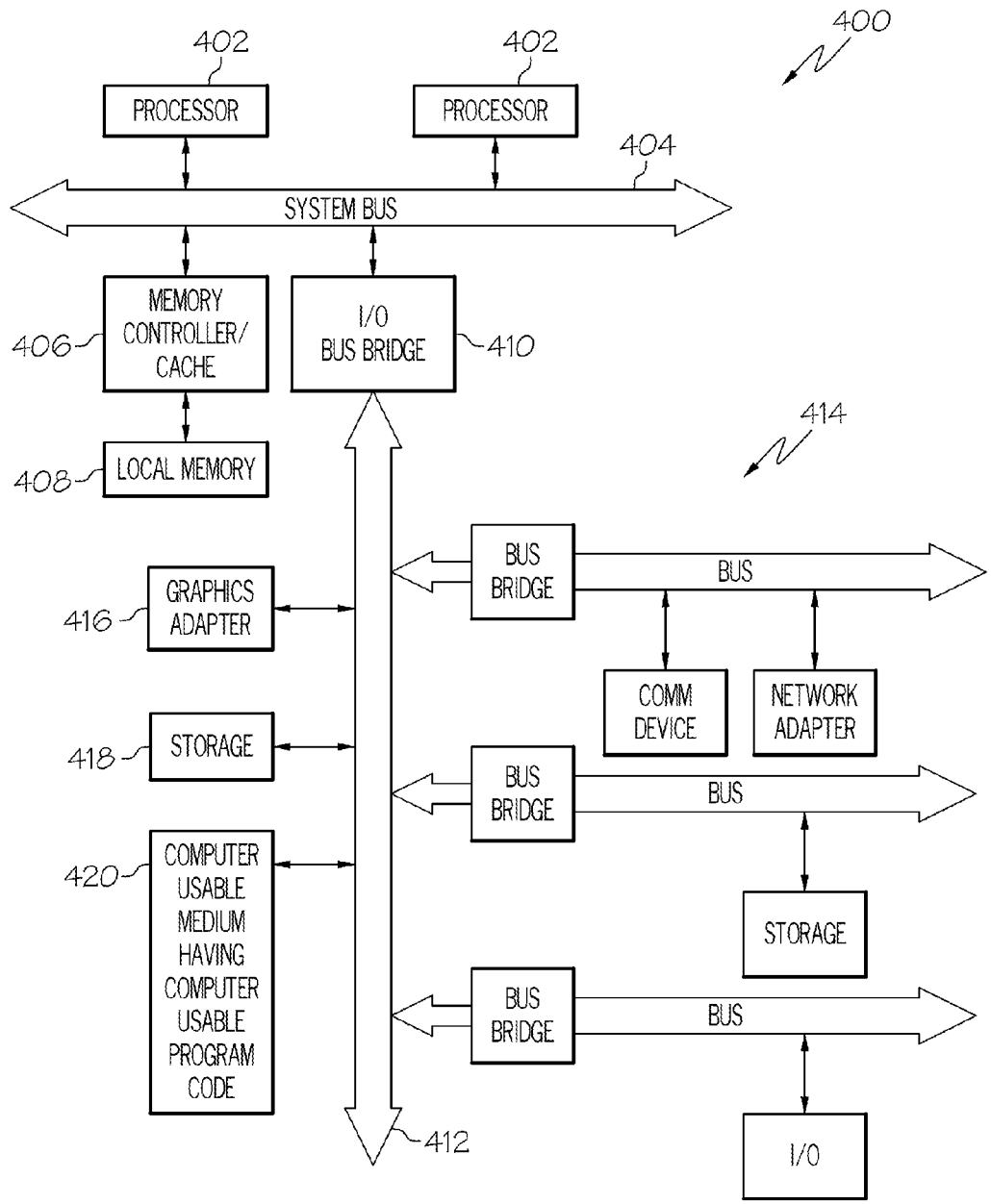
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 108 or aspects thereof, e.g., as set out in greater detail in FIG. 1-FIG. 3C, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3C.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer-implemented method for testing software, comprising:
    discovering, by an agent executing on a computer, testable code configured to execute on the computer;
    receiving, by the agent, a request related to testing the testable code from a requestor;
    in response to the request, sending the requestor a property of the testable code;
    receiving, by the agent, data related to the property;
    activating, by the agent, the testable code;
    generating a result from the activated testable code, said generating comprising:
        associating the received data with the property; and
        returning, by the agent, the result to the requestor.

2. The method of claim 1, wherein the testable code comprises a plurality of different components and the computer-implemented method further comprises:
    sending a list of the different components to the requestor; and
    receiving an indication for selecting a particular one of the different components, wherein the property is associated with the particular one of the components.

3. The method of claim 1, wherein:
    the property comprises plurality of different properties of the testable code; and
    the received data comprises respective portions of data related to each of the plurality of different properties of the testable code.

4. The method of claim 1, wherein the testable code is configured to execute within an application server executing on the computer.

5. The method of claim 1, wherein:
    the testable code comprises first executable code configured to execute on a first application server executing on the computer and second executable code configured to execute on a second application server, and the agent comprises:
        a first agent associated with the first executable code whereby the first agent responds to the request when the request relates to the first executable code, and
        a second agent associated with the second executable code whereby the second agent responds to the request when the request relates to the second executable code.

6. The method of claim 5, wherein the first agent is deployed on the first application server and the second agent is deployed on the second application server.

7. The method of claim 1, wherein the testable code comprises a plurality of different components configured to execute within an application server executing on the computer and the agent is deployed on the application server, wherein each component is comprised of a respective plurality of methods.

8. The method of claim 7, wherein the property of the testable code comprises a plurality of respective properties of one of the plurality of methods and the data comprises respective portions of data related to each of the properties of the one of the plurality of methods.

9. The method of claim 1, wherein the testable code comprises a plurality of components, wherein each component comprises a class, wherein each class comprises a plurality of methods, and each method comprises a plurality of properties, and wherein the property of the testable code comprises a particular property of one of the plurality of methods.

10. The method of claim 9, wherein a particular one of the components comprises one of a Java component and a .NET component.

11. A system for testing software, comprising:
    a processor;
    a non-transitory memory in communication with the processor, the non-transitory memory storing an agent module executable by the processor to:
        discover testable code configured to execute on the computer;
        receive a request related to testing the testable code from a requestor;
        in response to the request, send the requestor a property of the testable code;
        receive data related to the property;
        activate the testable code;
        associate the received data with the property to generate a result from the activated testable code; and
        return the result to the requestor.

12. The system of claim 11, wherein the testable code comprises a plurality of different components and the agent module executable by the processor to:
    send a list of the different components to the requestor; and
    receive an indication for selecting a particular one of the different components, wherein the property is associated with the particular one of the components.

13. The system of claim 11, wherein:
    the property comprises plurality of different properties of the testable code; and
    the received data comprises respective portions of data related to each of the plurality of different properties of the testable code.

14. The system of claim 11, wherein the testable code is configured to execute within an application server executing on the computer.

15. The system of claim 11, wherein:
    the testable code comprises first executable code configured to execute on a first application server executing on the computer and second executable code configured to execute on a second application server, and
    the agent module comprises:
        a first agent associated with the first executable code whereby the first agent responds to the request when the request relates to the first executable code, and
        a second agent associated with the second executable code whereby the second agent responds to the request when the request relates to the second executable code.

16. The system of claim 15, wherein the first agent is deployed on the first application server and the second agent is deployed on the second application server.

17. The system of claim 11, wherein the testable code comprises a plurality of different components configured to execute within an application server executing on the computer and the agent module is deployed on the application server, wherein each component is comprised of a respective plurality of methods.

18. The system of claim 17, wherein the property of the testable code comprises a plurality of respective properties of one of the plurality of methods and the data comprises respective portions of data related to each of the properties of the one of the plurality of methods.

19. The system of claim 11, wherein the testable code comprises a plurality of components, wherein each component comprises a class, wherein each class comprises a plurality of methods, and each method comprises a plurality of properties, and wherein the property of the testable code comprises a particular property of one of the plurality of methods.

20. The system of claim 19, wherein a particular one of the components comprises one of a Java component and a .NET component.

21. A computer program product for testing software, comprising:
a non-transitory computer readable storage medium having computer readable program code embodied therewith, the computer readable program code comprising:
computer readable program code configured to discover testable code configured to execute on the computer;
computer readable program code configured to receive a request related to testing the testable code from a requestor;
computer readable program code configured to, in response to the request, send the requestor a property of the testable code;
computer readable program code configured to receive data related to the property;
computer readable program code configured to activate the testable code;
computer readable program code configured to generate a result from the activated testable code, said computer readable program code configured to generate a result comprising computer readable program code configured to associate the received data with the property; and
computer readable program code configured to return the result to the requestor.

22. The computer program product of claim 21, wherein the testable code comprises a plurality of different components and further comprises:
computer readable program code configured to send a list of the different components to the requestor; and
computer readable program code configured to receive an indication for selecting a particular one of the different components, wherein the property is associated with the particular one of the components.

23. The computer program product of claim 21, wherein:
the property comprises plurality of different properties of the testable code; and
the received data comprises respective portions of data related to each of the plurality of different properties of the testable code.

24. The computer program product of claim 21, wherein the testable code is configured to execute within an application server executing on the computer.

25. The computer program product of claim 21, wherein:
the testable code comprises first executable code configured to execute on a first application server executing on the computer and second executable code configured to execute on a second application server, and further comprises:
computer readable program code configured to implement a first agent associated with the first executable code whereby the first agent responds to the request when the request relates to the first executable code, and
computer readable program code configured to implement a second agent associated with the second executable code whereby the second agent responds to the request when the request relates to the second executable code.

26. The computer program product of claim 25, wherein the first agent is deployed on the first application server and the second agent is deployed on the second application server.

27. The computer program product of claim 21, wherein the testable code comprises a plurality of different components configured to execute within an application server executing on the computer and computer readable program code configured to implement an agent module is deployed on the application server, wherein each component is comprised of a respective plurality of methods.

28. The computer program product of claim 27, wherein the property of the testable code comprises a plurality of respective properties of one of the plurality of methods and the data comprises respective portions of data related to each of the properties of the one of the plurality of methods.

29. The computer program product of claim 21, wherein the testable code comprises a plurality of components, wherein each component comprises a class, wherein each class comprises a plurality of methods, and each method comprises a plurality of properties, and wherein the property of the testable code comprises a particular property of one of the plurality of methods.

30. The computer program product of claim 29, wherein a particular one of the components comprises one of a Java component and a .NET component.

* * * * *